Patented July 6, 1954

2,683,104

UNITED STATES PATENT OFFICE 2,683,104

STARCH-ACETONE-FORMALDEHYDE COMPOSITION

Mortimer T. Harvey, South Orange, and Peter L. Rosamilia, Newark, N. J., assignors to Harvel Research Corporation, Irvington, N. J., a corporation of New Jersey No Drawing. Application January 24, 1952, Serial No. 268,138

6 Claims. (Cl. 154—43)

This invention relates to novel products and also to articles of manufacture in which one or more of said products is employed in the production thereof. In one of its more specific aspects, the invention is directed to novel compositions of matter produced by combining starch with water-soluble, thermosetting, thickened acetone-formaldehyde resinous organic reaction products. In another specific aspect, the invention is directed to a laminated article of manufacture, and more specifically to such laminated articles of manufacture, in which one element is kraft paper and the other element is cardboard, corrugated cardboard, kraft paper, corrugated kraft paper, etc., secured to each other by a combination of starch and said thickened acetone-formaldehyde resinous organic reaction products converted to the substantially dry state.

The thickened acetone-formaldehyde resinous organic reaction products employed in the practice of this invention, and hereinafter referred to as "thickened acetone-formaldehyde resins," are produced by reacting acetone and formaldehyde under alkaline conditions in the mole ratio of one mole of acetone to 3–5 moles of formaldehyde and then thickening the resultant acetone-formaldehyde organic reaction product until the viscosity of said thickened acetone-formaldehyde resins is such that an 80% aqueous solution thereof has a viscosity at 25° C. of 2000–15,000 centipoises. Said thickened acetone-formaldehyde resins are thermosetting, and by thermosetting we mean they may be converted to the substantially dry and infusible state when maintained at 350° F. for 16 hours.

Said thickened acetone-formaldehyde resins are further characterized as follows: they are water-soluble and by that we mean that they will dissolve in or be dissolved by water measuring by weight up to three times the weight of the resin to provide a substantially clear, non-milky solution; aqueous solutions of said thickened acetone-formaldehyde resins measuring 4 parts of said thickened resin and 1 part of water are stable for at least six months at 70° F. and have a pH of approximately 4.5–6.5.

A variety of different starches may be employed in the practice of this invention. Some of them are corn starch, potato starch, tapioca starch, rice starch, arrowroot starch, wheat starch, barley starch, oat starch, etc., and also such starches which have been partially dextrinized by dilute acids or ferments, and in general the degree of dextrinization may be between 0–25%. These starches as well as the partially dextrinized starches may be employed alone or in combination with one another in the practice of this invention.

According to this invention, said thickened acetone formaldehyde resins are combined with one or more of said starches, dextrinized starches, or combinations of starch and dextrinized starch with a ratio by weight of the former to the latter being in the range of 1–30 parts of the former to 100 parts of the latter. These combinations find a variety of uses in a number of different fields and are particularly useful as adhesives and especially as adhesives for paper to paper.

The aqueous combinations which are provided comprise the thickened acetone-formaldehyde resins and 0–25% dextrinized starches in the ratios above set forth and preferably also contain an alkaline agent in amount such that the pH of said aqueous combination is in the range of 7.5–12, and the quantity of water in said combination is equal to and may be 1–10 times the weight of starch.

The following Example A is given merely by way of illustration and not limitation, and describes a typical method which may be employed for producing a thickened acetone-formaldehyde resin which may be employed in the practice of this invention.

Example A 300 pounds of acetone together with 1700 pounds of formaldehyde (37% concentration in water) are charged into an autoclave unit with the stirrer in operation throughout the entire operation. Steam is admitted to the jacket of the unit until the temperature of the mix therein has been raised to approximately 120° F. In a separate container, there was made up an aqueous solution of caustic soda consisting of 25 pounds of sodium hydroxide and 60 pounds of water. This solution was divided into four equal parts. Cold water is admitted to the jacket of the autoclave and the first quarter of the caustic soda solution is added to the mix, which is at 120° F., whereupon an exothermic reaction takes place and the temperature of the reacting mass is controlled by the cold water in the jacket so that it slowly rises to about 200° F. then slowly begins to fall. When the temperature falls to about 185° F. the second portion of the caustic soda solution is added, whereupon the temperature of the mass is again allowed to rise to approximately 200° F. Then upon falling to 185° F. the procedure is repeated allowing the temperature to rise and fall as before between the additions of the caustic soda solution, and keeping the cold water on the jacket at all times. Then after the last increment of caustic soda solution has been added and the temperature of the mass allowed to rise to about 200° F. it is allowed to fall until it reaches approximately 150° F. at which time the cold water is shut off. The vacuum is turned on keeping the vent of the autoclave open. The vent is slowly closed and the steam turned on, while the vacuum is maintained and the temperature of the mass is continued at approximately 150° F. so that partial dehydration is effected. The dehydration is thus continued until there remains in the vessel a partially dehydrated acetone-formaldehyde resinous reaction product and the mass therein is an 80% aqueous solution which measures approximately four parts of said acetone-formaldehyde organic reaction product in one part of water. This mix is discharged from the reaction vessel, is filtered and the resultant clear solution so obtained is amber-colored, contains acetone-formaldehyde organic reaction products measuring by weight at least and generally more than 75% of the combined weights of the acetone and formaldehyde in the original charge. Said solution has a viscosity at 25° C. of approximately 275 centipoises. The acetone-formaldehyde organic reaction product, known as Product A, in said solution may be converted to the substantially solid and infusible state when maintained at 350° F. for 16 hours and may be jelled at room temperature within four hours upon the addition of lime.

Said 80% aqueous solution of said Product A is then treated to increase the viscosity of said Product A and to decrease the free formaldehyde content thereof. For that purpose, said 80% aqueous solution of Product A is placed in a reacting vessel and there is added thereto an alkaline agent. When said alkaline agent is added thereto, at room temperature, the pH of the mass at that tempearture is initially increased to at least 8. Some of the alkaline agents which may be employed are preferably mild alkaline agents, which ordinarily are added thereto in aqueous solutions and may be sodium sulphite, sodium acetate, potassium sulphite, or equivalent compounds to increase the pH of the mass to at least 8. The temperature of the mass is now slowly heated to a temperature of 220–300° F. The mass is maintained, while being constantly stirred, within said temperature range, whereupon the resinous mass therein thickens considerably and the pH of an aqueous solution of a sample thereof is less than the original pH. The temperature of said mass is maintained within said temperature range until the viscosity of a solution consisting of four parts of said thickened acetone-formaldehyde resin in one part of water measures 2000–15,000 centipoises at 25° C., and for most commercial purposes 3,000–8,000 centipoises at 25° C., and when sodium sulphite was used as the alkaline agent, the pH of this solution measure between 4.5–6.5.

This provides a simple, easily controllable method imminently suitable in factory practice for thickening or increasing the viscosity of the acetone-formaldehyde reaction products to the desired degree and practically eliminates the danger of the resinous product from going over to the infusible state in the reaction vessel. More specifically, for example, 250 pounds of an aqueous solution consisting of four parts of Product A in one part of water is mixed with an aqueous solution consisting of seven pounds of sodium sulphite dissolved in four parts of water. The mixture, while being constantly stirred, is heated to approximately 250° F. and maintained at that temperature, whereupon it thickens. Samples of the mass as it thickens are taken at intervals and the heat is cut off when a solution consisting of 4 parts of a sample of the thickened mass dissolved in one part of water is in the range of 2000–15,000 centipoises at 25° C. Then enough water is added to the thickened acetone-formaldehyde resin to provide a solution which measures four parts of said resin to each part of water present. This batch is an aqueous solution of said resin and will have a viscosity within the range hereinbefore set forth.

While in the aforesaid Example A, there has been described the method for producing acetone-formaldehyde reaction products with the ratio of acetone to formaldehyde being one to four and the thickening of the same, it is understood that the same method in general may be employed and the ratio of acetone and formaldehyde may be varied within the limits hereinbefore set forth to produce a wide variety of thickened reaction products all of which have the characteristics heretofore set forth and serve as components of this invention.

Said thickened acetone-formaldehyde resins may be combined with starch and/or 0–25% dextrinized starch in a number of different manners. For example, 1–30, by weight, parts of one or a combination of two or more acetone-formaldehyde resins may be added directly to 100 parts of one or a combination of two or more of said starches and/or said partially dextrinized starches. The starch and/or partially dextrinized starch may first be combined with water and either with or without first heating the mass, the thickened acetone-formaldehyde resin may be added as such or in the form of an aqueous solution. There also may be added to these various combinations one or more alkalies, examples of which are sodium hydroxide, potassium hydroxide, borax, etc., which aid in the ready conversion of the ultimate combination to the substantially solid state, and so that the mass may be applied on the alkaline side so that proper setting may be obtained.

These various compositions of this invention are particularly useful as paper adhesives, paper sizings, etc. When employed as adhesives for kraft paper on corrugated kraft board and cured at 150° F., the resultant laminated structure, after being immersed in water for 24 hours, was found to have a very high strength at the adhesion interfaces and exhibited substantially no delamination, while such a laminated structure made up by using straight starch without first combining it with one of said thickened acetone-formaldehyde resins, was found to have delaminated in large part and also to have lost to a great degree the adhesion at the interfaces.

The following examples, given merely for the purpose of illustration, set forth two of the methods which may be employed in the production of novel compositions and articles of manufacture of this invention:

*Example 1*

100 pounds of powdered corn starch slightly yellow in color and 600 pounds of water are charged into a tank. This mixture is stirred for a short period of time, while its temperature may be room temperature or elevated to 70°–120° F. and until the mixture is substantially homogeneous throughout. Then, while said mix is being constantly stirred, there is added thereto approximately 5 pounds of an 80% aqueous solution of the thickened acetone-formaldehyde resin produced according to Example A. After that mix has been stirred to provide a substantially homogeneous mass throughout, there is added slowly thereto, while the mass is being constantly stirred, an aqueous solution consisting of 1.5 pounds of borax and 1.5 pounds of caustic soda in 10 pounds of water. This mass also is constantly stirred within said temperature range until a substantially homogeneous mass results. This mass then is one of the novel compositions of the invention, and is hereinafter known as Product I.

*Example 2*

100 pounds of powdered corn starch slightly yellow in color and 700 pounds of water are charged into a tank. The mix is heated, while being constantly stirred, to a temperature of 150°–180° F. and, while being constantly stirred, is maintained at that temperature for approximately half an hour. Then into said mass, which is constantly stirred throughout this entire operation, there is added 8 pounds of an 80% aqueous solution of a thickened acetone-formaldehyde resin produced according to Example A. After approximately 5 minutes of stirring, there is added to said mass an aqueous solution consisting of 2.5 pounds of borax and 1 pound of caustic soda in 10 pounds of water. This alkaline solution is added slowly while the mass is being constantly stirred, so that the resultant mass will be substantially homogeneous and is hereinafter known as Product II, and is one of the novel compositions of this invention.

Product I and Product II are examples of the novel compositions of matter of this invention which may be coated on the face of the paper, such as kraft paper for example, or other base to be treated. Products I and II may be employed alone or first may be combined with each other and thereafter applied in films on corrugated kraft cardboard or on one face of the paper which is then placed in contact with the corrugated board or other element to which it is to adhere. Then said multiply unit with said composition there between may be heated to an elevated temperature, as for example 150° F., for a short period of time whereupon the film will be converted to the substantially solid state and will be found to exhibit exceptional adhesion properties even after the resultant laminated material has been immersed in water for 24 hours, and found after such treatment to have a very high strength at the adhesion interfaces and will exhibit substantially no delamination.

Since certain changes may be made in the above compositions of matter and different embodiments of the invention could be made without departing from its scope, it is intended that all matter contained in the above description shall be interpreted as illustrative and not in a limiting sense.

It is also to be understood that the following claims are intended to cover all the generic, and specific features of the invention herein described and all statements of the scope of the invention, which as a matter of language might be said to fall there between; and that they are intended to be inclusive in scope and not exclusive, in that, if desired, other materials may be added to our novel compositions of matter herein claimed without departing from the spirit of the invention. Particularly it is to be understood that in said claims, ingredients or components recited in the singular are intended to include compatible mixtures of said ingredients wherever the sense permits.

We claim:

1. A combination comprising 100 parts by weight of starch dextrinized to a degree of 0–25%, and 1–30 parts by weight of thickened acetone-formaldehyde resin produced by thickening acetone-formaldehyde organic reaction product produced by reacting acetone and formaldehyde under aqueous alkaline conditions in the mole ratio of 1 mole of acetone to 3–5 moles of formaldehyde, partially dehydrating and maintaining subsequent alkaline conditions at at least about 8, said thickened acetone-formaldehyde resin being soluble with water up to three times its weight of water, being thermosetting and having a viscosity such that 4 parts thereof when in 1 part of water has a viscosity at 25° C. of 2,000–15,000 centipoises, 2. A composition of matter comprising an aqueous combination of 100 parts by weight of starch, dextrinized to a degree of 0.25%, an alkaline agent, and 1–30 parts by weight of thickened acetone-formaldehyde resin produced by thickening acetone-formaldehyde organic reaction product, said organic reaction product produced by reacting acetone and formaldehyde under aqueous alkaline conditions in the mole ratio of 1 mole of acetone to 3–5 moles of formaldehyde, partially dehydrating and maintaining subsequent alkaline conditions at at least about 8, said thickened acetone-formaldehyde resin being soluble with water up to three times its weight of water, being thermosetting, and having a viscosity 4 parts thereof when in 1 part of water at 25° C. of 2,000–15,000 centipoises, the amount of said alkaline agent in said aqueous combination being such that the pH of said aqueous combination is in the range of 7.5–12.

3. A base, a substantially solid coating on said base and being a heat converted composition of matter, said composition of matter before said conversion comprising a composition as defined in claim 1.

4. A base, a substantially solid coating on said base and being a heat converted composition of matter, said composition of matter before said conversion comprising a composition as defined in claim 2.

5. An article of manufacture comprising a plurality of elements, and an adhesive there between, said adhesive being a substantially solid product produced by heat converting a composition of matter there between and comprising a composition as defined in claim 1.

6. An article of manufacture comprising a plurality of elements, and an adhesive there between, said adhesive being a substantially solid product produced by heat converting a composition of matter there between and comprising a composition as defined in claim 2.

References Cited in the file of this patent

UNITED STATES PATENTS

| Number | Name | Date |
|---|---|---|
| 2,529,851 | Scrutchfield | Nov. 14, 1950 |